Jan. 4, 1966    G. E. WHITE    3,227,524
BRINE GENERATOR
Filed Oct. 31, 1960
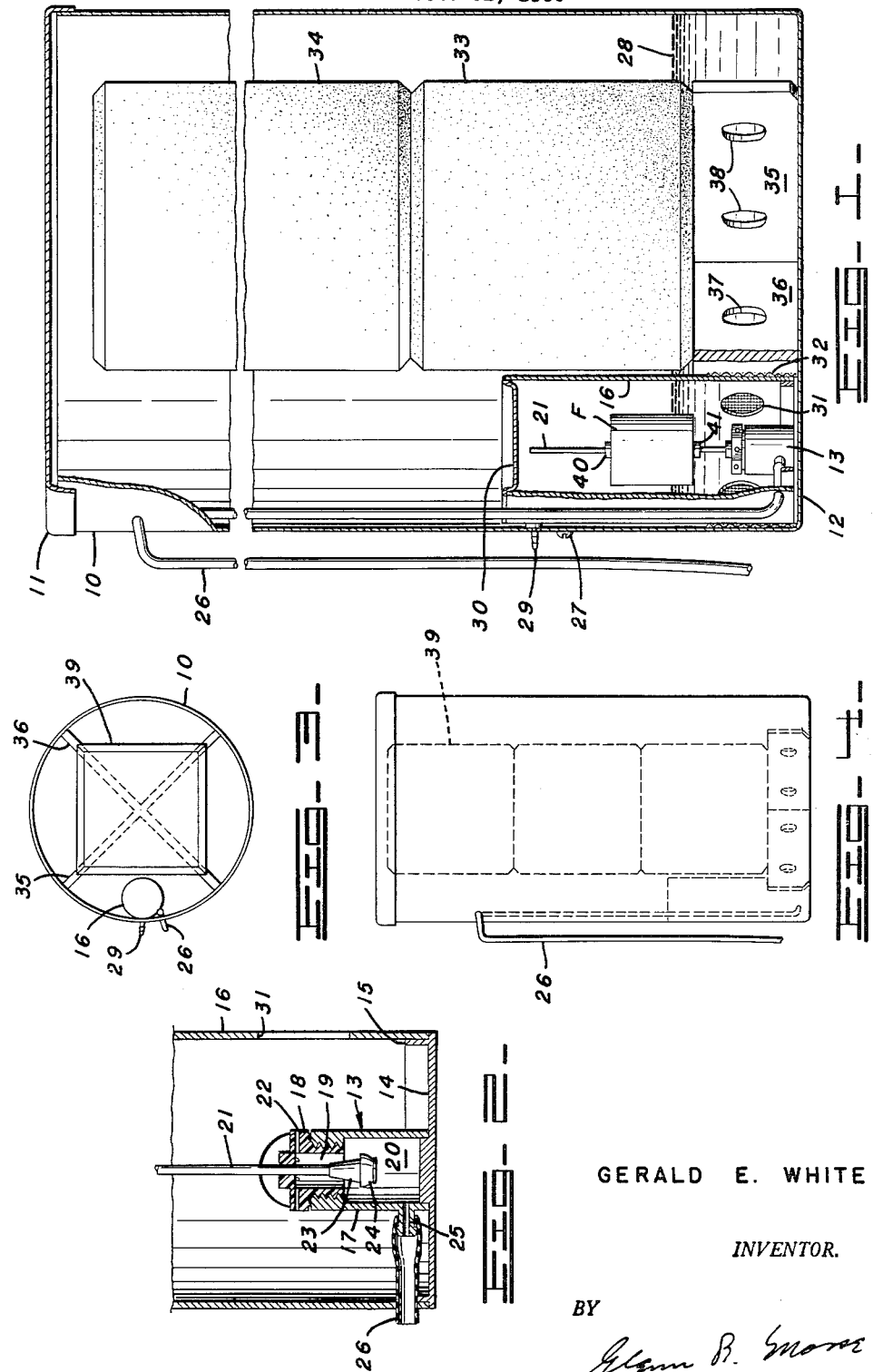
GERALD E. WHITE
INVENTOR.
BY

United States Patent Office 3,227,524
Patented Jan. 4, 1966

3,227,524
BRINE GENERATOR
Gerald E. White, 747 S. Shore Drive, Holland, Mich.
Filed Oct. 31, 1960, Ser. No. 66,218
2 Claims. (Cl. 23—267)

This invention relates to the construction of solution generators, and the preferred form of the invention has been adapted to produce brine for the regeneration of water-softeners. The regeneration of an ion-exchange water-softening process involves the passage of brine solution through the softener at selected intervals. It is preferable that an exactly predetermined concentration and quantity of solution be used in order to obtain the greatest effectiveness in the process. It has been common practice to generate the brine in a tank containing solid pieces or particles of salt which are dissolved by water admitted under the control of a float valve. Rock salt and salt pellets have proven to be somewhat unsatisfactory because of difficulties in handling these materials, as well as the problem involved in maintaining the solution quantity as the supply of salt diminishes.

It is conventional practice to deliver to the softener during the regeneration process the entire contents of the generating tank, rather than attempt to control the delivery on a time or measurement basis. When water is admitted to the tank containing the salt pieces or particles, it is obvious that the displacement of the salt will severely affect the quantity of solution generated by the tank, as long as the level is controlled by a float mechanism. This problem is particularly acute where large blocks of salt are used, which appears to be the most satisfactory method of providing the salt for the solution, as far as the handling characteristics are concerned. A block of salt in new condition will displace the given quantity of water, and the brine delivery of the tank will simply be the capacity of the tank up to the predetermined level, minus the displacement of the block (together with other incidental items which may be below the water level). As the block dissolves its displacement below the liquid level decreases, with the net result that the brine quantity delivered to the water softener correspondingly increases. To obtain an adequate brine delivery at the beginning of the dissolving of the blocks results in maintaining an excess during a major portion of the time in which the device is operating, and this is unsatisfactory for maximum efficiency.

It is the purpose of this invention to provide a system for utilizing block salt in a manner in which the quantity of brine delivered is substantially constant. To maintain the amount of displacement afforded by the salt block at a substantially constant amount, the block is supported at a distance above the bottom of the tank which is slightly below the level of the water maintained by the float valve mechanism. The water is therefore afforded access to the salt substantially along the bottom surface of the block, and that is all the contact that is provided. The general principle of supporting salt at a distance above the bottom in order to limit the exposure of the salt to an area having a minimum of displacement is not new. None of these arrangements that have been used to date, however, appear to be satisfactory for use in conjunction with salt in block form, although they have been at least partially effective when used in connection with rock salt or pellets. The arrangement provided by this invention is deceptively simple, but has made the use of block salt very practical and entirely satisfactory. The invention not only provides for the support of the salt, but also provides a very effective valve mechanism for controlling the water level around the support system.

Applicant has found that the answer to the problem of supporting the salt blocks has been to provide the support ports in a normally horizontal plane at widely spaced points, or along intersecting lines. This arrangement leaves the major portion of the underside of the salt free to communicate with the water. This arrangement is in definite contrast to the use of perforated platforms, these having the result of providing too much interference with the access of the water to the salt, and (in effect) shielding the salt from proper exposure. The several features of the invention will be analyzed in further detail through a discussion of the particular embodiments illustrated in the accompanying drawing. In the drawing:

FIGURE 1 presents a sectional side elevation of a brine-generator such as might be used in conjunction with a water-softener.

FIGURE 2 presents a sectional elevation on an enlarged scale of the details of the float valve illustrated in FIGURE 1.

FIGURE 3 presents a plan view on a reduced scale of the brine generator shown in FIGURE 1, with the cover removed.

FIGURE 4 presents a side exterior elevation of the brine generator shown in FIGURE 1, on the scale of FIGURE 3.

Referring to the drawing, the brine generator includes a cylindrical tank 10 provided with a cover 11. Preferably the tank is constructed with an integral bottom 12. The valve mechanism generally indicated at 13 has its base 14 resting on the bottom 12 of the tank, and is provided with a peripheral flange 15 receiving the tubular housing 16 which is provided as a protection for the float valve mechanism. The valve 13 also includes a central cylindrical structure 17 forming a chamber having a threaded opening in the top which receives a similarly threaded portion of the closure plug 18. A bore 19 communicates with the chamber indicated at 20, and a smaller bore coaxial with the bore 19 extends upwardly to form a guide for slidably receiving the float rod 21. A series of generally horizontal holes 22 extends from the bore 19 outward in a substantially radial direction to form the exhaust for the liquid admitted into the chamber 20 under pressure.

The rod 21 is provided with a conical member 23 at its lower extremity and with a shoulder member 24 of resilient material such as rubber. As the level of the water increases, the float F will gradually move the rod 21 upwardly to the point where the pressure within the chamber 20 will take over at the last instant and move the assembly upward until further movement is limited by the engagement of the shoulder member 24 with the underside of the closure plug 18. Water is admitted under pressure through the inlet-outlet extension 25 and the conduit 26. In assembly, the conduit 26 may be slipped over the inlet fitting 25. The conduit 26 is directed upwardly around the outside of the housing 16 to a point where it emerges from the tank 10 through a suitable opening. In this way, the conduit 26 is kept clear of the area in which the float F must move. The housing 16 is preferably secured to the sidewall of the tank 10 by a conventional fastening such as the screw indicated at 27 in FIGURE 1. An overflow outlet may also be provided, if desired, at some point above the water level 28, as indicated at 29. Preferably, the housing 16 should be provided with a cap as shown at 30. Liquid admitted into the housing 16 through the valve mechanism 13 finds its way out into the tank through the apertures 31 which may be screened as shown at 32. When suction is applied to the conduit 26 by a water-softener system, according to conventional practice, the reduction of pressure in the chamber 20 draws the rod 21 downward against the action of the float. The brine is then drawn into the chamber from the tank via the holes 22 and is conducted to the softener by the conduit 26.

The salt blocks 33 and 34 are supported on the platform provided by the intersecting wooden pieces 35 and 36. These are provided with openings 37 and 38 to permit the circulation of water. Referring particularly to FIGURE 3, the stack of blocks indicated at 39 is supported on intersecting lines defined by the tops of the members 35 and 36. The porosity of the wood is such that the salt appears to go into solution along the intersecting lines almost as readily as it does over the exposed bottom surface of the lowest block. It should be noted that the stack of blocks indicated at 39 has a dimensional relationship with the tank 10 such that the inclinability of the stack is limited. It is not possible to tilt the stack sufficiently for it to fall over, and this has a very interesting effect as the solution of the lower blocks from its under surface proceeds. Surprisingly enough, the pile of blocks is self-stabilizing with this arrangement. If it be presumed for a moment that minute variations in purity of the salt in various portions of the block results in an increase in the rate of dissolving along one side of the bottom surface, the net result would be a tendency for the stack to settle more rapidly in that area and to develop an inclination similar to the leaning tower of Pisa. Since this inclination is limited, however, it cannot proceed to the point of tipping over. When the limit of tilt has been reached, the area that had gone most rapidly in the solution reaches a condition where the salt in contact with the water is fully dissolved, leaving only the submerged area still active. This part proceeds to dissolve, so that the stability of the unit is maintained. It will be obvious that no dissolving can take place when the salt is above the level of the water; and as soon as this condition exists, all of the dissolving activity is restricted to the slower-acting portion of the block. The block cannot be lowered into further engagement with the water until the slow-acting portion has completed its passage into solution.

The closer that the level 28 of the water can be held to the level on the top of the platform the more constant will be the delivery of the quantity of solution. To avoid the necessity of an overly-sensitive valve mechanism, it is desirable to have some excess of depth over the top of the platform, on the order of a quarter of an inch or so. The float F is preferably adjustable along the length of the rod 21 to control the depth, its position being secured by the collars 40 and 41.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A solution generator, comprising: tank means; platform means for supporting blocks of soluble material at a predetermined distance from the bottom of said tank means, said platform means including a plurality of members providing support to said blocks at least at three spaced zones of small area disposed in a substantially horizontal plane; and float valve means for limiting the depth of liquid in said tank to a level slightly above the top of said platform means, said float valve means including a tubular housing secured to the inside of said tank means, a body portion having a base provided with a peripheral flange receiving said tubular housing and also including a central structure forming a chamber having inlet means and a threaded opening in the top of said chamber, said valve means also including a threaded closure member for said opening having an axial bore communicating with said chamber and a smaller bore coaxial therewith and continuing upward therefrom, said closure member having a plurality of holes extending from said first-named bore to the exterior of said closure member, said valve means also including a rod having float means adjacent one end and an upwardly converging conical member terminating in a shoulder of resilient material secured to the opposite end thereof, said rod being slidably received in said second-named bore, and said conical member being freely axially receivable in said first-named bore limited by the engagement of said shoulder with said closure member below said holes.

2. A generator, comprising: tank means; platform means for supporting blocks of soluble material at a predetermined distance from the bottom of said tank means, said platform means including a plurality of members providing support to said blocks at least at three spaced zones of small area disposed in a substantially horizontal plane; and float valve means for limiting the depth of liquid in said tank to a level slightly above the top of said platform means, said float valve means including a body portion having a central structure forming a chamber having inlet means and an opening in the top of said chamber, said valve means also including a closure member for said opening having an axial bore communicating with said chamber and a smaller bore coaxial therewith and continuing upward therefrom, said closure member having at least one hole extending from said first-named bore to the exterior of said closure member, said valve means also including a rod having float means adjacent one end and an upwardly converging conical member terminating in a shoulder of resilient material secured to the opposite end thereof, said rod being slidably received in said second-named bore, and said conical member being freely axially receivable in said first-named bore limited by the engagement of said shoulder with said closure member below said holes.

References Cited by the Examiner

UNITED STATES PATENTS

| | | | |
|---|---|---|---|
| 805,003 | 11/1905 | Clary | 137—433 |
| 839,147 | 12/1906 | Hollender | 137—433 |
| 2,471,158 | 5/1949 | Livingstone | 23—267 |
| 2,501,260 | 3/1950 | Brodin | 23—272.6 XR |
| 2,649,203 | 8/1953 | Hannibal | 137—268 |
| 2,716,422 | 8/1955 | Whitlock | 210—190 XR |
| 2,935,031 | 5/1960 | Kryzer | 137—391 |
| 3,073,674 | 1/1963 | Rudelick | 23—272.6 XR |

NORMAN YUDKOFF, *Primary Examiner.*

GEORGE D. MITCHELL, MAURICE BRINDISI,
*Examiners.*